US007970291B2

(12) United States Patent
Nagakubo

(10) Patent No.: US 7,970,291 B2
(45) Date of Patent: Jun. 28, 2011

(54) OPTICAL-RECEIVING APPARATUS AND BIAS-VOLTAGE-CONTROL METHOD USED FOR THE OPTICAL-RECEIVING APPARATUS

(75) Inventor: Yasunori Nagakubo, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 738 days.

(21) Appl. No.: 12/000,188

(22) Filed: Dec. 10, 2007

(65) Prior Publication Data

US 2008/0138092 A1    Jun. 12, 2008

(30) Foreign Application Priority Data

Dec. 11, 2006  (JP) ................................ 2006-333754

(51) Int. Cl.
*H04B 10/06* (2006.01)
(52) U.S. Cl. ........ 398/208; 398/202; 398/209; 398/135; 398/136; 398/137; 250/214 A; 250/214 AG; 250/214 R; 250/214 C; 250/214 LA; 327/513; 327/514; 327/538
(58) Field of Classification Search .................. 398/202, 398/208, 209, 213, 214, 135, 136, 137, 138, 398/139, 154, 155, 158, 159, 164, 33, 25, 398/26, 27, 17, 22, 24; 250/214 R, 214 C, 250/214 A, 214 AG, 214.1, 214 LA; 327/513, 327/514, 538
See application file for complete search history.

(56) References Cited

U.S. PATENT DOCUMENTS

| 6,222,660 | B1* | 4/2001 | Traa .............................. 398/213 |
| 6,313,459 | B1* | 11/2001 | Hoffe et al. ................ 250/214 R |
| 6,333,804 | B1 | 12/2001 | Nishiyama et al. |
| 2002/0057480 | A1 | 5/2002 | Ushiyama |

FOREIGN PATENT DOCUMENTS

| JP | 11-40840 | 2/1999 |
| JP | 2002-217833 | 8/2002 |
| JP | 2004-289206 | 10/2004 |
| JP | 2006-128940 | 5/2006 |

* cited by examiner

*Primary Examiner* — Hanh Phan
(74) *Attorney, Agent, or Firm* — Staas & Halsey LLP

(57) ABSTRACT

According to an optical-receiving apparatus including an APD converting input light into an electric signal and a bias-voltage-control method used for the optical-receiving apparatus, a multiplication factor appropriate for the APD is predetermined and a multiplication factor used for the APD can be maintained at the level of the predetermined multiplication factor at all times according to a change in the ambient temperature of the APD so that the intensity of input light-transmitted to the APD can be monitored with accuracy. The optical-receiving apparatus further includes a bias circuit generating a bias voltage applied to the APD based on a control signal, a temperature-monitor circuit monitoring the ambient temperature, and an operating circuit that stores data on the predetermined multiplication factor and that controls the bias circuit so that the multiplication factor corresponding to the monitored temperature becomes the predetermined multiplication factor.

3 Claims, 15 Drawing Sheets

FIG.4

$$M \equiv \frac{1}{1-(V_{apd}/V_{br})^n} \quad (1)$$

$$V_{br} = V_{br\,(T=t)} + \Gamma \cdot (T-t) \quad (2)$$

FIG.8

| | |
|---|---|
| n | BEFOREHAND MEMORIZED DATA CONCERNED WITH APD (11) |
| Γ | CONSTANT INDEPENDENT OF TEMPERATURE BASED COMPOSITION OF APD (12) |
| t | TEMPERATURE INCLINATION OF BREAKDOWN VOLTAGE (13) |
| $V_{br(T=t)}$ | STANDARD TEMPERATURE ... BREAKDOWN VOLTAGE AT STANDARD TEMPERATURE (14) |

FIG.9

| MEMORIZED DATA DURING WORKING | | |
|---|---|---|
| (21) | T | AMBIENT TEMPERATURE OF APD |
| (22) | $V_{apd}$ / ERROR RATE | BIAS VOLTAGE/ERROR RATE |
| (23) | $V_{apd}(M)$ | BIAS VOLTAGE IN MINIMUM ERROR RATE |
| (24) | $V_{br}(T)$ | BREAKDOWN VOLTAGE AT TEMPERATURE T |
| (25) | M | STANDARD MULTIPLICATION FACTOR |
| (26) | $V_{apd}(T)$ | BIAS VOLTAGE AT TEMPERATURE T |

OPTICAL-RECEIVING APPARATUS AND BIAS-VOLTAGE-CONTROL METHOD USED FOR THE OPTICAL-RECEIVING APPARATUS

BACKGROUND OF THE INVENTION

1. Field of the Invention

The present invention relates to an optical-receiving apparatus including an avalanche photodiode and particularly relates to an optical-receiving apparatus and a bias-voltage-control method-used for the optical-receiving apparatus that are provided to control a bias voltage applied to the avalanche photodiode according to the ambient temperature of the avalanche photodiode so that a multiplication factor used for the avalanche photodiode becomes a predetermined multiplication factor.

2. Description of the Related Art

In many cases, an optical-receiving apparatus including an avalanche photodiode (hereinafter often referred to as an APD), as a photoreceptor, is used for an optical-communication apparatus.

It has become increasingly preferable that optical-transmission-and-reception apparatuses including the above-described optical-receiving apparatus be in conformity with a standard multi-source agreement (MSA) stipulated, so as to supply devices with stability. The term "MSA" denotes an industry format determined to establish a system used to supply products with stability by providing commonality among the package sizes, pin configurations, interface specifications, and so forth of products between a plurality of vendors.

A monitor signal generated by monitoring the intensity of an optical signal transmitted to the optical-receiving apparatus is defined by the above-described MSA. While the optical-receiving apparatus is operated, a user makes a request to monitor the optical signal transmitted to the optical-receiving apparatus at all times by using the monitor signal. For responding to the user's request, a high degree of monitor accuracy should be achieved.

An optical-receiving apparatus disclosed in Japanese Unexamined Patent Application Publication No. 11-40840 includes an APD configured to generate the optical-signal current corresponding to the intensity of an optical signal transmitted to the APD. Subsequently, the optical-receiving apparatus monitors the optical-signal current flowing through the APD by using a current-mirror circuit.

It is preferable that the optical-signal current flowing through the APD operate linearly at all times with reference to the intensity of the optical signal-transmitted to the APD. In a range where the intensity of the optical signal is high, the optical-signal current is proportional to the optical-signal intensity. In a range where the optical-signal intensity is low, an ordinary optical-receiving apparatus such as an optical-receiving apparatus disclosed in Japanese Unexamined Patent Application Publication No. 2002-217833 controls a bias voltage applied to the APD so that a multiplication factor is increased, so as to optimize the signal-to-noise ratio. Subsequently, in the range where the optical-signal intensity is low, the optical-signal current becomes nonlinear with reference to the optical-signal intensity, which makes it difficult to monitor the intensity of the transmitted optical signal with accuracy.

However, according to Japanese Unexamined Patent Application Publication No. 2004-289206, the relationship between the intensity of an optical signal transmitted to an APD and an optical-signal current flowing through the APD is made to be an almost linear relationship according to a change in the ambient temperature of the APD, which gives an answer to the problem described in Japanese Unexamined Patent Application Publication No. 2002-217833.

For optical-receiving apparatuses including an APD, there has been disclosed at least one technology which allows for establishing the relationship between the intensity of input light transmitted to the APD and an optical current (monitor current) flowing through the APD, as an almost linear relationship. In that case, however, the optical current (monitor current) becomes nonlinear as a multiplication factor changes due to temperature fluctuations.

SUMMARY

The present invention provides an optical-receiving apparatus and a bias-voltage-control method used for the optical-receiving apparatus. When the optical-receiving apparatus includes an APD, a multiplication factor appropriate for the APD is predetermined and a multiplication factor used for the APD can be maintained at the level of the predetermined multiplication factor at all times according to a change in the ambient temperature of the APD so that the intensity of input light transmitted to the APD can be monitored with accuracy.

According to a first aspect of the present invention, there is provided an optical-receiving apparatus including an APD configured to convert input light into an electric signal, a bias circuit configured to generate a bias voltage applied to the APD based on a control signal, a temperature-monitor circuit configured to monitor the ambient temperature of the APD, and an operating circuit configured to store data on a predetermined multiplication factor and control the bias circuit so that the multiplication factor corresponding to a temperature monitored by the temperature-monitor circuit becomes the predetermined multiplication factor.

According to the first aspect, it becomes possible to provide the optical-receiving apparatus which controls the bias voltage applied to the APD so that the multiplication factor used for the APD becomes the predetermined multiplication factor on which data is stored in the operating circuit.

According to a second aspect of the present invention, in the optical-receiving apparatus according to the first aspect, the predetermined multiplication factor is the multiplication factor corresponding to the bias voltage obtained when a signal error of transmitted input light is minimized.

According to the second aspect, it becomes possible to provide the optical-receiving apparatus wherein the predetermined multiplication factor becomes the multiplication factor obtained when the signal error of the transmitted input light is minimized and the bias voltage applied to the APD is controlled so that the multiplication factor is achieved.

According to a third aspect of the present invention, there is provided a bias-voltage-control method used for an optical-receiving apparatus including an APD configured to convert input light into an electric signal. The bias-voltage-control method includes a multiplication-factor-setting step performed to set a unique multiplication factor in advance, and a bias-voltage-control step performed to control a bias voltage of the APD so that the multiplication factor corresponding to the ambient temperature of the APD becomes the unique multiplication factor.

According to the third aspect, it becomes possible to provide the bias-voltage-control method used for the optical-receiving apparatus configured to control the bias voltage applied to the APD so that the multiplication factor used for the APD becomes the predetermined multiplication factor on which data is stored in the operating circuit.

According to a fourth embodiment of the present invention, in the bias-voltage-control method of the optical-receiving apparatus according to the third aspect, the multiplication-factor-setting step includes a bias-voltage-adjustment step performed to adjust the bias voltage so that a signal error of transmitted input light is minimized, a first breakdown-voltage-calculation step performed to calculate the breakdown voltage corresponding to an ambient temperature of the APD, the ambient temperature being observed when the bias voltage is obtained, at the bias-voltage-adjustment step, based on a temperature inclination of a breakdown voltage of the APD, and a multiplication-factor-calculation step performed to calculate a multiplication factor by using the bias voltage obtained through the bias-voltage-adjustment step, the breakdown voltage calculated through the first breakdown-voltage-calculation step, and a constant calculated based on the composition of an element of the APD.

According to the fourth aspect, it becomes possible to provide the bias-voltage-control method used for the optical-receiving apparatus wherein the predetermined multiplication factor becomes the multiplication factor achieved when the signal error of the transmitted input light is minimized, and the bias voltage applied to the APD is controlled so that the above-described multiplication factor is obtained.

According to an embodiment of the present invention, there are provided an optical-receiving apparatus and a bias-voltage-control method used for the optical-receiving apparatus so that a multiplication factor is calculated, the multiplication factor being achieved when the signal error of input light transmitted under a predetermined temperature condition is minimized, data on the multiplication factor is stored in the optical-receiving apparatus, and a bias voltage applied to the APD is controlled so that the multiplication factor corresponding to a temperature condition under which the optical-receiving apparatus is operated becomes the multiplication factor on which data is stored in the optical-receiving apparatus.

BRIEF DESCRIPTION OF THE DRAWINGS

FIG. 4 shows arithmetic expressions used for an operating circuit;

FIG. 8 is a drawing (1) illustrating a table of a data-memory part;

FIG. 9 is a drawing (2) illustrating another table of the data-memory part;

DESCRIPTION OF THE PREFERRED EMBODIMENTS

Figure 1:
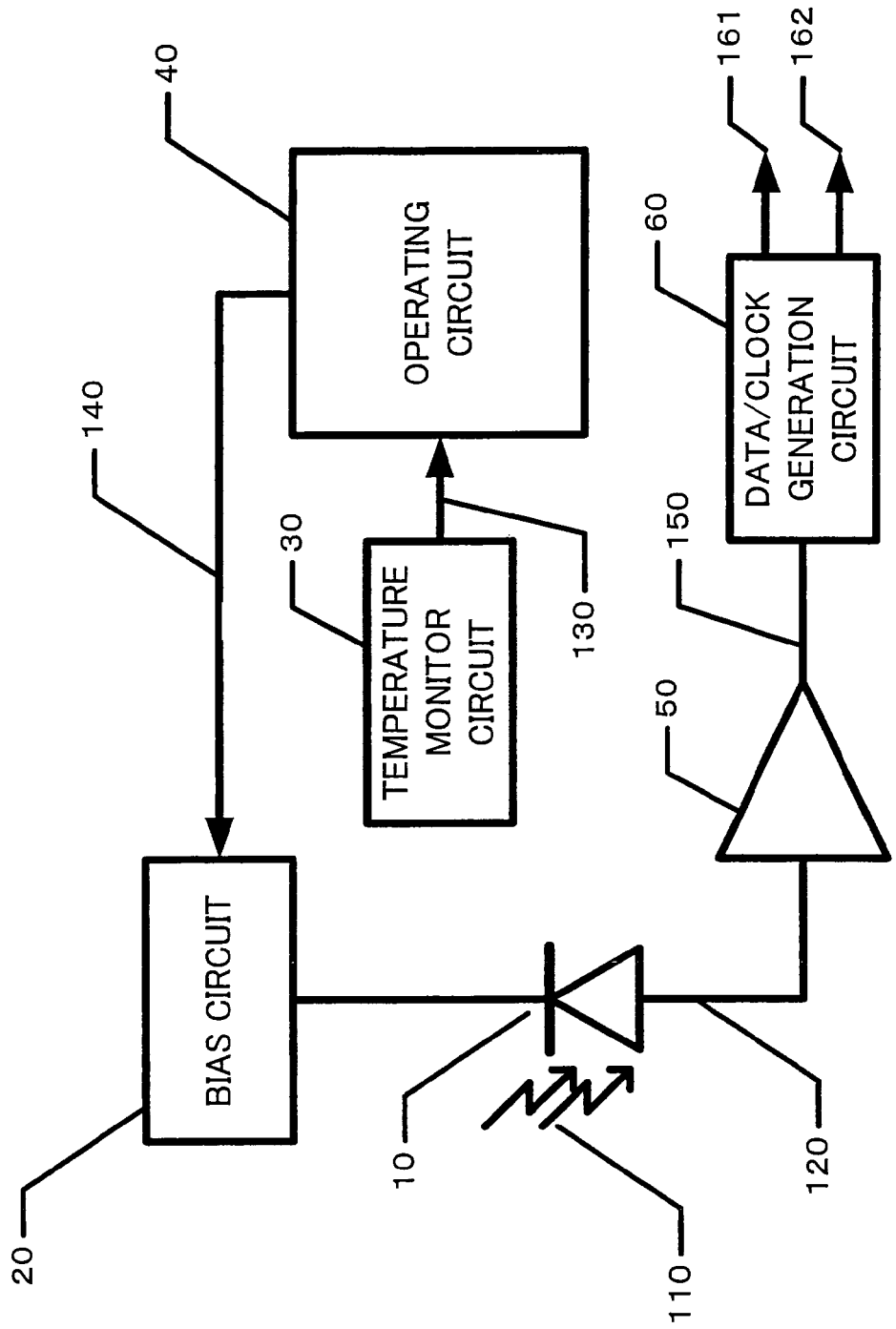
FIG. 1 illustrates the basic configuration of an optical-receiving apparatus according to an embodiment of the present invention.

Hereinafter, embodiments of the present invention will be described in detail with reference to the attached drawings. Further, the same parts and/or similar parts shown in the drawings are designated by the same reference numerals.

FIG. 1 illustrates the basic configuration of an optical-receiving apparatus according to an embodiment of the present invention. The optical-receiving apparatus includes an avalanche photodiode (APD) 10 configured to receive an optical signal 110 which is input light and generate the optical-signal current 120 corresponding to the intensity of the optical signal 110. The optical-receiving apparatus further includes a bias circuit 20 configured to apply a bias voltage to the APD 10, a temperature-monitor circuit 30 configured to monitor the ambient temperature of the APD 10, and an operating circuit 40 configured to store data on a predetermined multiplication factor, as data on a standard multiplication factor M, and perform an operation, so as to generate information used to control the bias voltage (bias-voltage-control information 140) based on information that is transmitted from the temperature-monitor circuit 30 and that is obtained by monitoring the ambient temperature of the APD 10 (temperature-monitor information 130). Here, the bias circuit 20 controls the bias voltage based on the bias-voltage-control information 140. The optical-receiving apparatus further includes an amplification circuit 50 configured to convert the voltage of the optical-signal current 120 and amplifies a voltage signal obtained through the voltage conversion and a data/clock-generation circuit 60 configured to generate a data signal 161 and a clock signal 162 included in the amplified voltage signal 150.

Figure 2:
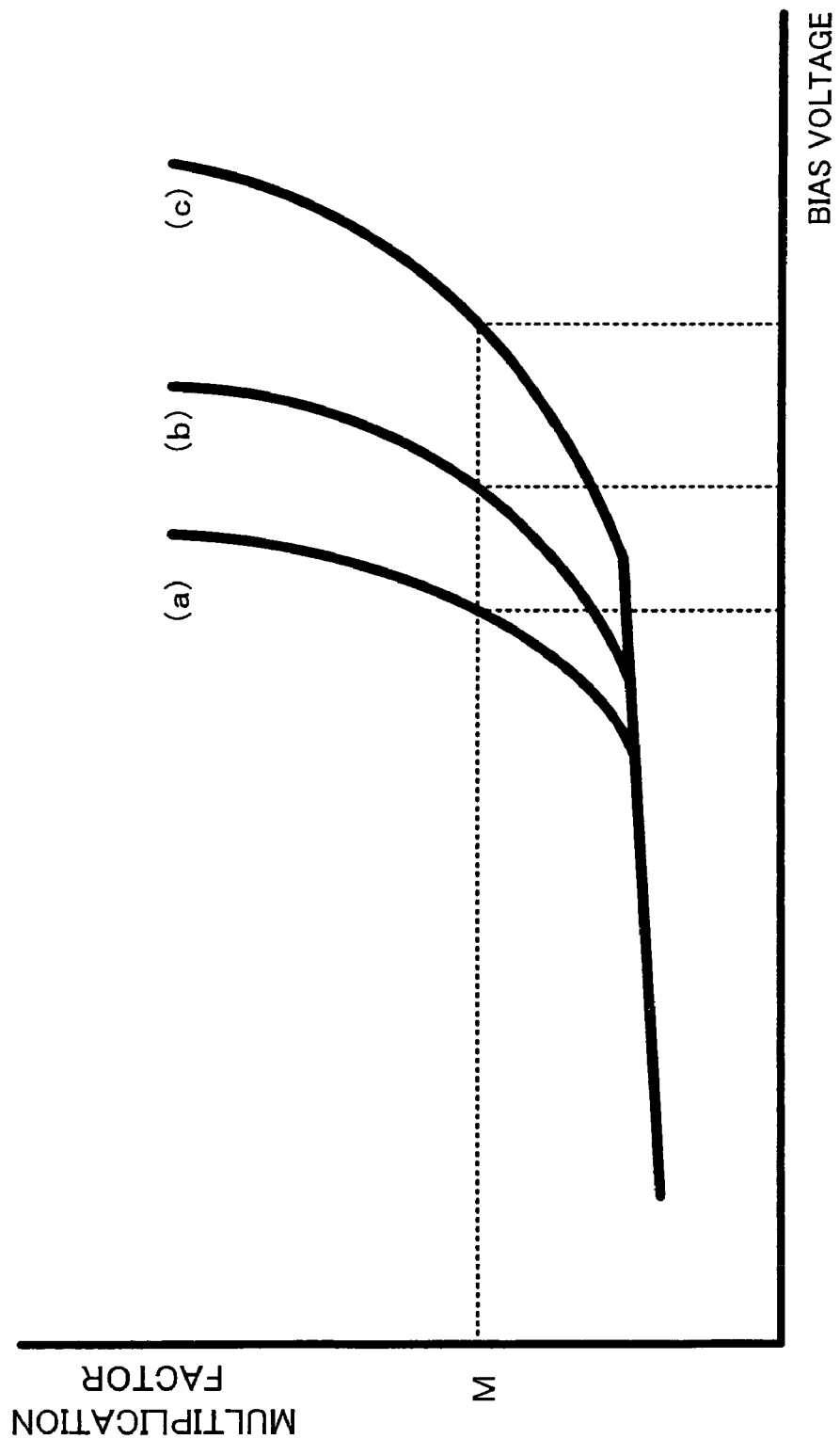
FIG. 2 shows the relationship between the multiplication factor of an APD, a bias voltage, and a temperature.

FIG. 2 shows the relationship between the multiplication factor of an ordinary APD, a bias voltage, and a temperature. Curve (a) schematically shows the relationship between the multiplication factor of the APD and the bias voltage when the ambient temperature of the APD is 0° C. Curve (b) schematically shows the relationship between the multiplication factor of the APD and the bias voltage when the ambient temperature of the APD is 25° C. Curve (c) schematically shows the relationship between the multiplication factor of the APD and the bias voltage when the ambient temperature of the APD is 60° C. As shown in FIG. 2, the relationship between the multiplication factor and the bias voltage changes according to the ambient temperature of the APD. When the ambient temperature of the APD changes, the multiplication factor can be kept constant by controlling the bias voltage applied to the APD.

Thus, an optical-receiving apparatus according to an embodiment of the present invention calculates the bias voltage applied to the APD 10 by performing an operation based on the monitored ambient temperature of the APD 10 and controls the bias circuit 20 based on the operation result. Namely, the operating circuit 40 calculates the bias voltage applied to the APD 10 by performing the operation based on the temperature-monitor information 130 so that a multiplication factor used for the APD 10 becomes the stored standard multiplication factor M, and controls the bias circuit 20 based on the operation result.

First Embodiment

Figure 3:
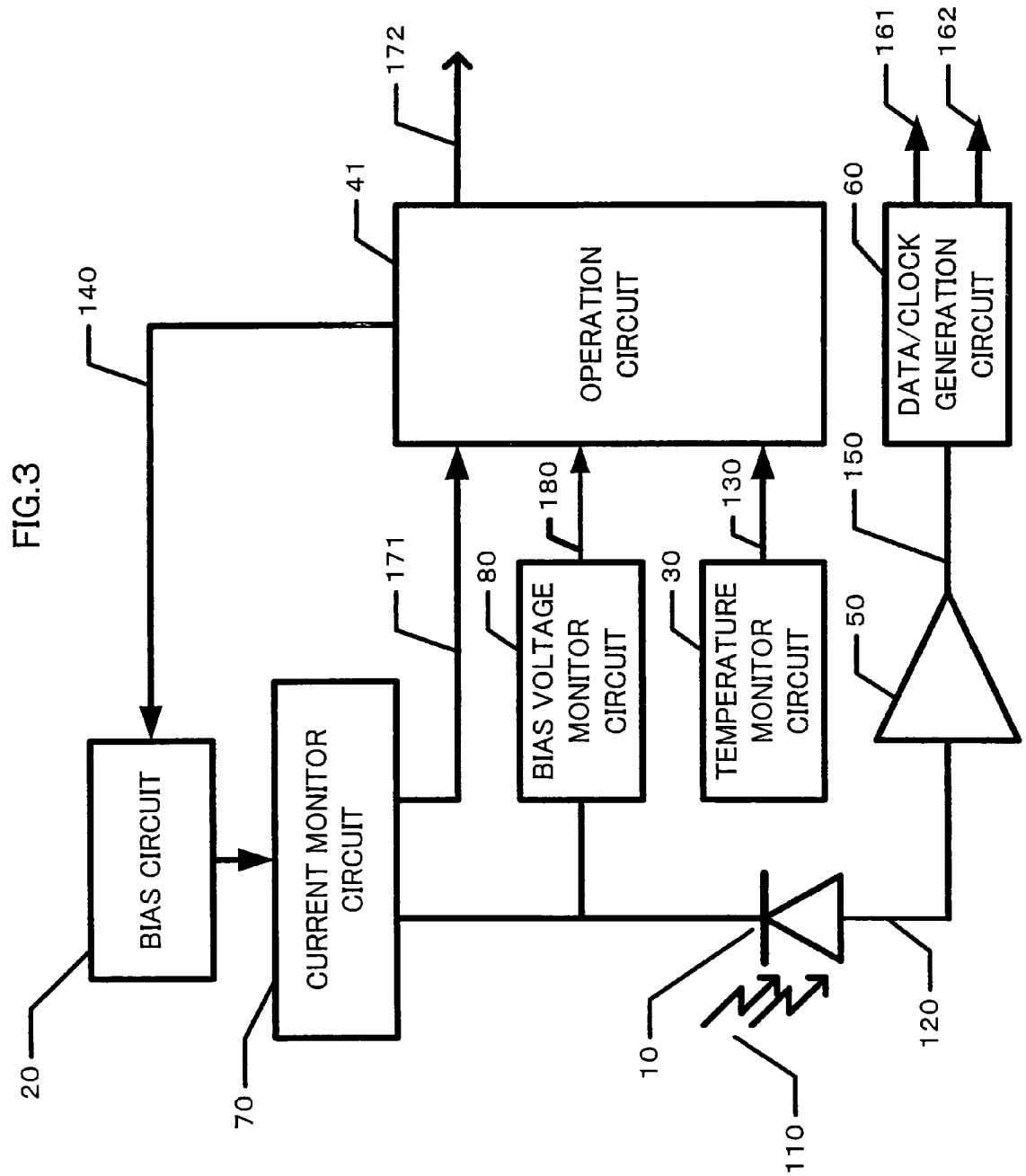
FIG. 3 is a drawing (1) illustrating an optical-receiving apparatus according to another embodiment of the present invention.

FIG. 3 is a drawing (1) illustrating an optical-receiving apparatus according to an embodiment of the present invention.

FIG. 4 shows arithmetic expressions (1) and (2) used for the operating circuit 40.

Figure 5:
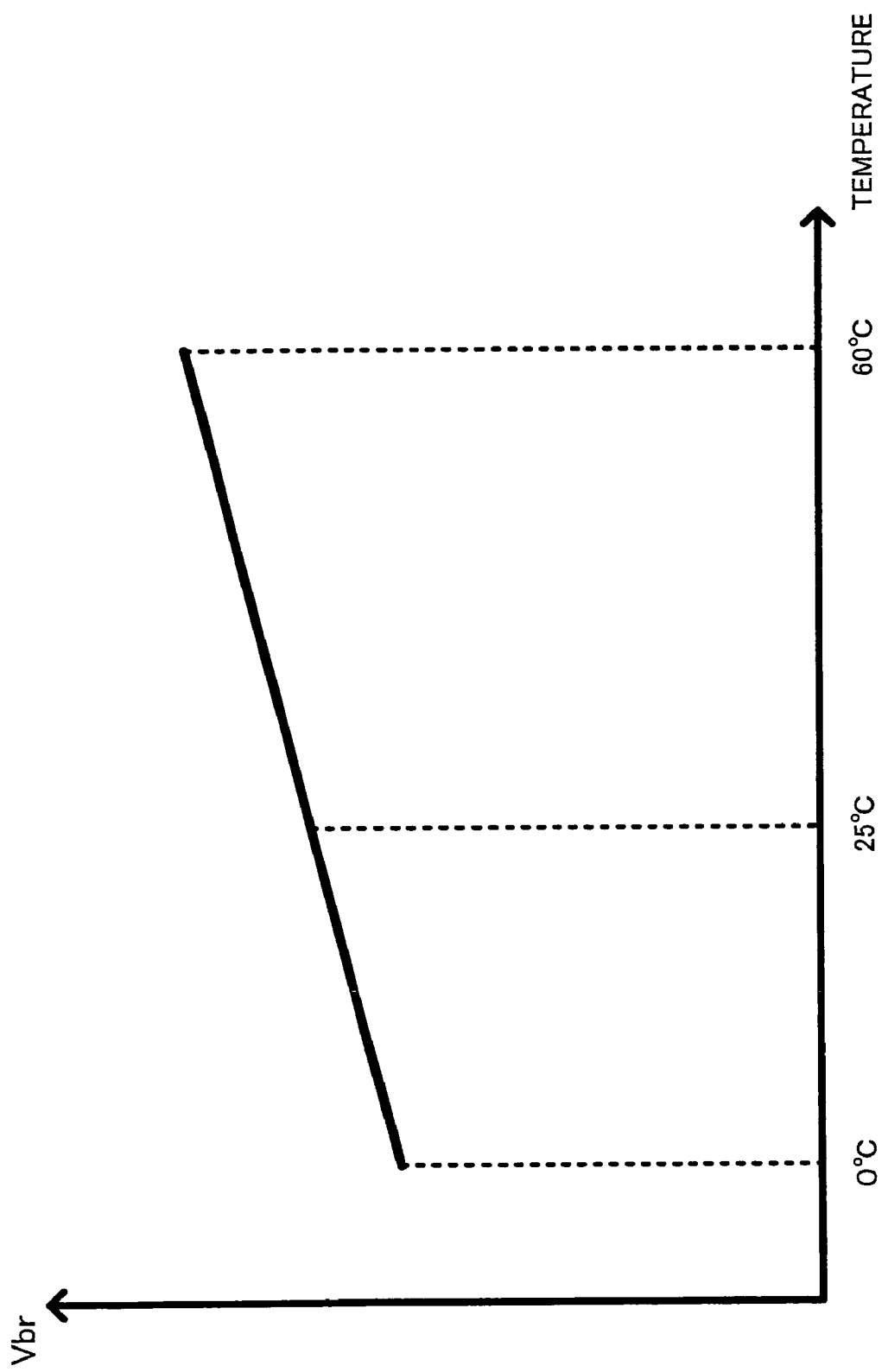
FIG. 5 shows the temperature inclination of a breakdown voltage.

FIG. 5 shows the temperature inclination of a breakdown voltage, that is, the relationship between the breakdown voltage of an avalanche photodiode and a temperature. According to the characteristics of the ordinary avalanche photodiode shown in FIG. 2, the breakdown voltage of the avalanche photodiode has temperature dependence showing the temperature inclination (symbolized by ⌈) shown in FIG. 5. The characteristic shown in FIG. 5 can be expressed by the arithmetic expression (2) shown in FIG. 4. According to the arithmetic expression (2), the breakdown voltage $V_{br}$ corresponding to the temperature T can be obtained with reference to the breakdown voltage $V_{br(T=t)}$ achieved when the temperature T is equivalent to the predetermined temperature t (an ordinary temperature of 25° C., for example).

In FIG. 3, the bias voltage generated by the bias circuit 20 is applied to the APD 10. When the optical signal 110 which is the input light is transmitted, the optical-signal current 120 corresponding to the intensity of the optical signal 110 flows from the bias circuit 20 functioning, as the current source, into a current-monitor circuit 70 and the APD 10. The amplification circuit 50 receives the optical-signal current 120, converts the signal of the transmitted optical-signal current 120 into a voltage signal, and amplifies the voltage signal to a predetermined level so that a voltage signal 150 is obtained. The data/clock-generation circuit 60 receives the amplified voltage signal 150, and generates a data signal 161 and a clock signal 162 that are included in the voltage signal 150. The current-monitor circuit 70 includes a current-mirror circuit, for example, monitors the optical-signal current 120, and generates a monitor current 171. The temperature-monitor circuit 30 monitors the ambient temperature of the APD 10 and generates the temperature-monitor information 130.

The APD 10 receives the optical signal 110 under a predetermined temperature condition (e.g., the ordinary temperature of 25° C., for example). An operation circuit 41 controls the bias circuit 20 so that an error in the transmitted optical signal 110 is minimized, and a bias-voltage-monitor circuit 80 monitors a bias voltage generated by the bias circuit 20. The operating circuit 41 is notified of information about the monitored bias voltage (bias-voltage-monitor information 180). Under the above-described temperature condition, the operating circuit 41 calculates the multiplication factor corresponding to the above-described temperature of the APD 10 by using the arithmetic expression (1) shown in FIG. 4 based on the breakdown voltage $V_{br}$ of the APD 10, the bias voltage $V_{apd}$ obtained when the value of the signal error is minimized, and the constant n that is calculated based on the composition of the component of the APD 10 and that is independent of a temperature. Further, the operating circuit 41 stores information about the calculated multiplication factor, as information about the standard multiplication factor M.

Then, the operating circuit 41 performs an operation by using the arithmetic expression (2) shown in FIG. 4 based on the ambient temperature of the APD 10, the ambient temperature being monitored by the temperature-monitor circuit 30. Subsequently, the operating circuit 41 calculates the breakdown voltage $V_{br}$ of the APD 10, the breakdown voltage corresponding to the ambient temperature, and stores information about the calculated breakdown voltage $V_{br}$.

The operating circuit 41 performs the following operation by using the arithmetic expression (1) shown in FIG. 4. Namely, the operating circuit 41 calculates the bias voltage $V_{apd}$ corresponding to the standard multiplication factor M that had been calculated and stored by using information about the calculated and stored breakdown voltage $V_{br}$ and the constant n of which information is stored in advance. Further, the operating circuit 41 stores information about the bias voltage $V_{apd}$.

The operating circuit 41 generates bias-voltage-control information 140 based on the calculated and stored bias voltage $V_{apd}$ and controls the bias circuit 20.

The operating circuit 41 receives the monitor current 171, converts the monitor current 171 into data generated under a condition that had already been determined by Multi-Source Agreement (MSA) or the like, and generates a monitor signal 172.

Hereinafter, the case where the above-described standard multiplication factor M is calculated will be described in detail.

Figure 6:
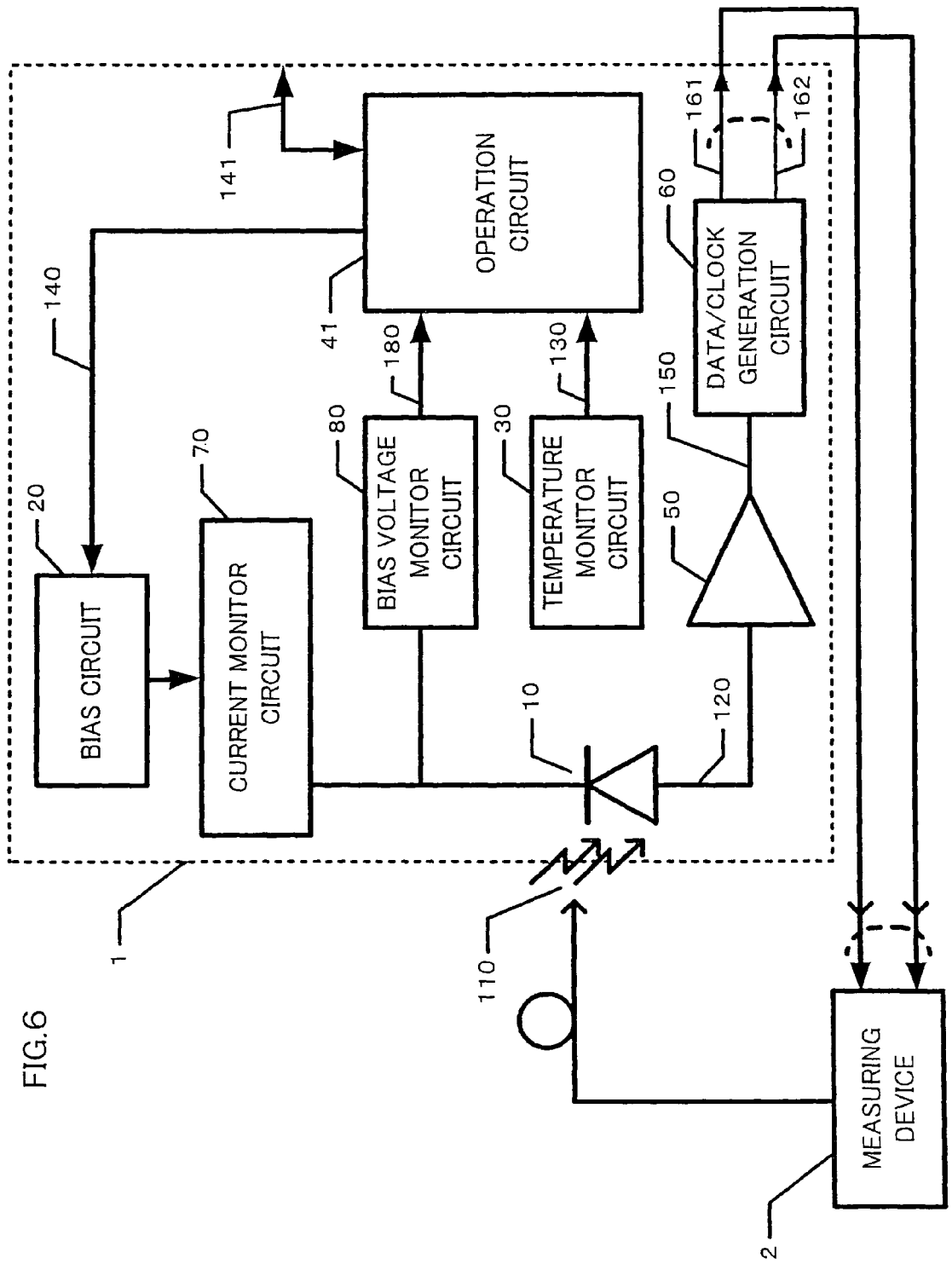
FIG. 6 illustrates the case where a standard multiplication factor is set in advance.

FIG. 6 shows the case where the standard multiplication factor is set in advance.

Figure 7:
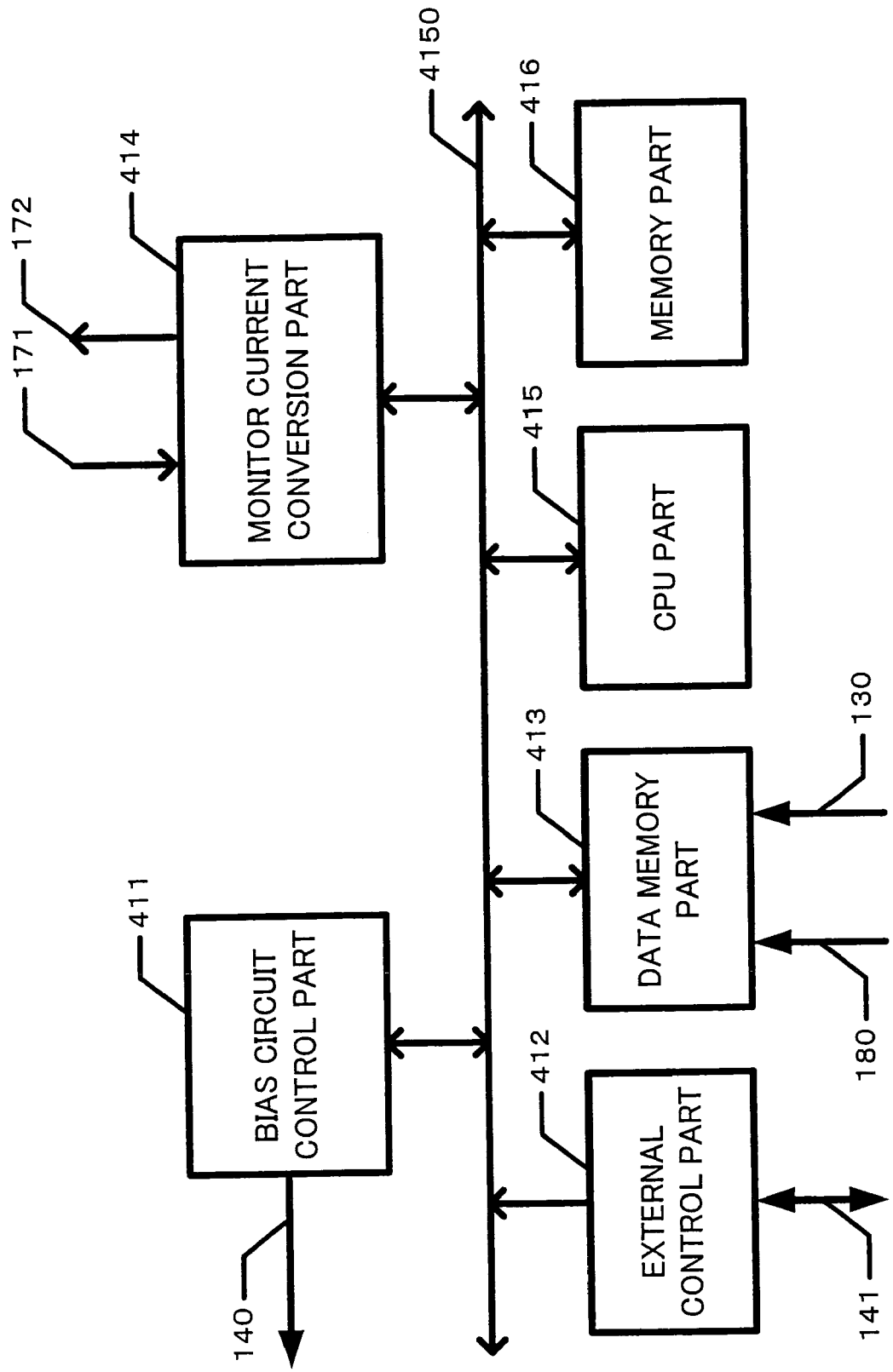
FIG. 7 illustrates the operating circuit.

FIG. 7 shows the functional configuration of the operating circuit 41, so as to illustrate the operating circuit 41.

FIG. 8 shows Table (1) of a data-memory part 413. Table (1) shows data on the APD 10, where the data is stored in a table of the data-memory part 413 in advance.

FIG. 9 shows Table (2) of the data-memory part 413. Table (2) shows data stored in the data-memory part 413 when an optical-receiving apparatus according to an embodiment of the present invention is operated.

FIG. 6 shows an optical-receiving apparatus 1 according to an embodiment of the present invention and a measuring device 2. The measuring device 2 transmits the optical signal 110 to the optical-receiving apparatus 1 via an optical cable or the like, receives the data signal 161 and the clock signal 162 that are transmitted from the optical-receiving apparatus 1 via a coaxial cable or the like, and measures an error occurring in the optical signal 110. The configuration of the optical-receiving apparatus 1 shown in FIG. 6 is the same as that of the optical-receiving apparatus 1 shown in FIG. 3.

In FIG. 7, a bias-circuit-control part 411, an external-control part 412, the data-memory part 413, a monitor-current-conversion part 414, a CPU part 415, and a memory part 416 are provided. Each of the above-described functional parts is connected to a CPU bus 4150 and operates under the control of the CPU part 415.

The bias-circuit-control part 411 generates the bias-voltage-control information 140 used to control the bias circuit 20.

The external-control part 412 communicates with an externally connected apparatus (e.g., a personal computer which will be often referred to as an external device) via an external interface 141. When the external-control part 412 communicates with the external device, the operating circuit 41 is controlled by the external device.

The data-memory part 413 stores data on Tables (1) and (2) shown in FIGS. 8 and 9.

Before the optical-receiving apparatus 1 is operated, the data-memory part 413 stores data on an avalanche photodiode used by the optical-receiving apparatus 1 and data written in rows (11), (12), (13), and (14) shown in FIG. 8. The symbol n shown in the row (11) is a constant that is determined based on the composition of the APD element and that is independent of a temperature. The symbol ⌈ shown in the row (12) denotes the temperature inclination of the breakdown voltage. The symbol t shown in the row (13) denotes a standard temperature. The symbol $V_{br(T=t)}$ shown in the row (14) denotes a breakdown voltage achieved at the standard temperature t. The above-described data shown in the rows (11) to (14) is stored in the data-memory part 413 under the control of the external device connected to the external-control part 412.

The data-memory part 413 stores data shown in rows (21), (22), (23), (24), (25), and (26) that are shown in FIG. 9 when the optical-receiving apparatus 1 is operated. The symbol T shown in the row (21) denotes the ambient temperature of the APD 10 and corresponds to stored data transmitted, as the temperature-monitor information 130. Information about the symbol $V_{apd}$ and an error rate that are shown in the row (22) denotes a bias voltage applied to the APD 10 and an error-rate value measured in the bias voltage. The bias voltage $V_{apd}$ denotes stored data transmitted, as bias-voltage-monitor information 180. The error-rate value corresponds to stored data on a measurement result obtained by a measuring device 2 when the bias voltage $V_{apd}$ is achieved, the measurement-result data being transmitted via the external device. Therefore, data on a plurality of bias voltages $V_{apd}$ and error rates is stored in the row (22). The bias voltage $V_{apd(M)}$ shown in the row (23) denotes a bias voltage obtained when the value of the error rate is minimized. Namely, data on the bias voltage $V_{apd(M)}$ is stored in the row (23), where the bias voltage $V_{apd(M)}$ corresponds to an error rate which is the smallest of all the error rates of which data is stored in the row (22). The voltage $V_{br(T)}$ shown in the row (24) is a breakdown voltage achieved at the temperature T shown in the row (21). The value of the breakdown voltage $V_{br(T)}$ is obtained through an operation performed by the operating circuit 41, as described above. That is to say, the operating circuit 41 reads the value of each of the symbol ┌ shown in the row (12), the symbol t shown in the row (13), the symbol $V_{br(T-t)}$ shown in the row (14) that are shown in FIG. 8, and the value of the symbol T shown in the row (21) shown in FIG. 9 from the data-memory part 413. Then, the operating circuit 41 calculates the breakdown voltage $V_{br}$ obtained at the temperature T according to the arithmetic expression (2) of FIG. 4 by using each of the above-described values, and stores data on the calculated breakdown voltage $V_{br}$ in the data-memory part 413. The symbol M shown in the row (25) denotes the standard multiplication factor obtained through an operation performed by the operating circuit 41, as described above. Namely, the operating circuit 41 reads the value of each of the symbol n shown in the row (11) of FIG. 8, and the symbol $V_{apd(M)}$ shown in the row (23) and the symbol $V_{br(T)}$ shown in the row (24) that are shown in FIG. 9 from the data-memory part 413, calculates the standard multiplication factor M according to the arithmetic expression (1) shown in FIG. 4 by using each of the read values, and stores data on the calculated standard multiplication factor M in the data-memory part 413. The symbol $V_{apd(T)}$ shown in the row (26) denotes the value of a bias voltage controlled at the temperature T and calculated through an operation performed by the operating circuit 41. That is to say, the operating circuit 41 reads the value of each of the breakdown voltage $V_{br(T)}$ achieved at the temperature T, the breakdown voltage $V_{br(T)}$ being shown in the row (24), and the standard multiplication factor M shown in the row (25) from the data-memory part 413, calculates the bias voltage $V_{apd(T)}$ according to the arithmetic expression (1) shown in FIG. 4 by using each of the read values, and stores data on the calculated bias voltage $V_{apd(T)}$ in the data-memory part 413.

The monitor-current-conversion part 414 receives the monitor current 171 transmitted from the current-monitor circuit 70, converts the monitor current 171 into data generated under a condition that had already been determined by MSA or the like, and generates the monitor signal 172.

The CPU part 415 performs operations according to the arithmetic expressions (1) and (2) that are shown in FIG. 4 according to a program stored in the memory part 416 and controls writing and/or reading of data necessary for performing the above-described operations.

The memory part 416 stores a program used to control operations or the like performed by the operating circuit 41.

Next, a method used by the optical-receiving apparatus 1 will be described. The method is performed by the optical-receiving apparatus 1, so as to calculate the standard multiplication factor (M) shown in the row (25) and control the bias voltage of the APD 10 provided in the optical-receiving apparatus 1.

A maintenance person connects the measuring device 2 to the optical-receiving apparatus 1, as shown in FIG. 6, and connects an external device (not shown) configured to control the operating circuit 41 to the optical-receiving apparatus 1 via the external interface 141.

The maintenance person transmits data relating to an avalanche photodiode used for the APD 10 (shown in the rows (11) to (14) shown in FIG. 8) from the external device and stores the data in the data-memory part 413.

The maintenance person controls the operating circuit 41 through the external device, so that the operating circuit 41 changes the bias voltage of the APD 10, monitors a signal error measured by the measuring device 2 via the external device, calculates the bias voltage corresponding to the minimum signal error, and stores data on the bias voltage in the data-memory part 413. At that time, the measuring device 2 may be connected to the external device so that a measuring system is achieved, the measuring system being configured to perform measurement under the control of the external device.

When the maintenance person control the operating circuit 41 through the external device, the operating circuit 41 calculates the multiplication factor and stores data on the standard multiplication factor M in the data-memory part 413.

Figure 10:
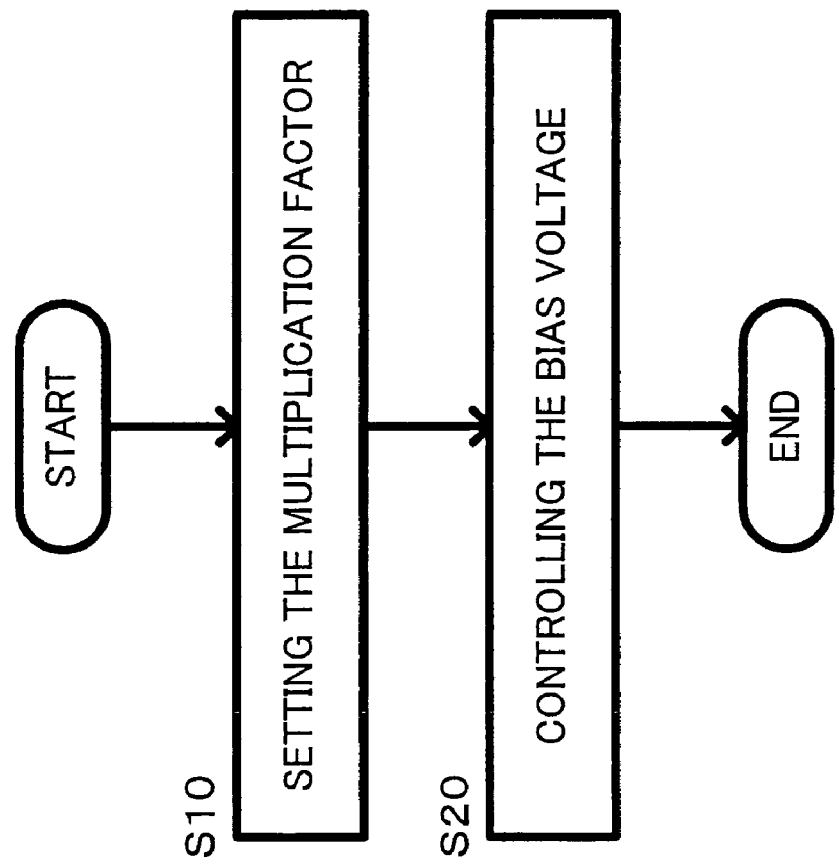
FIG. 10 shows the entire flow of bias-voltage controlling performed by the optical-receiving apparatus.

FIG. 10 shows the entire flow of bias-voltage controlling.

The processing corresponding to step S10 is performed to set the standard multiplication factor M necessary to control the bias voltage of the APD 10.

The processing corresponding to step S20 is performed to control the bias voltage so that the multiplication factor of the APD 10 becomes the standard multiplication factor M determined, at step S10, under a changing temperature condition.

Figure 11:
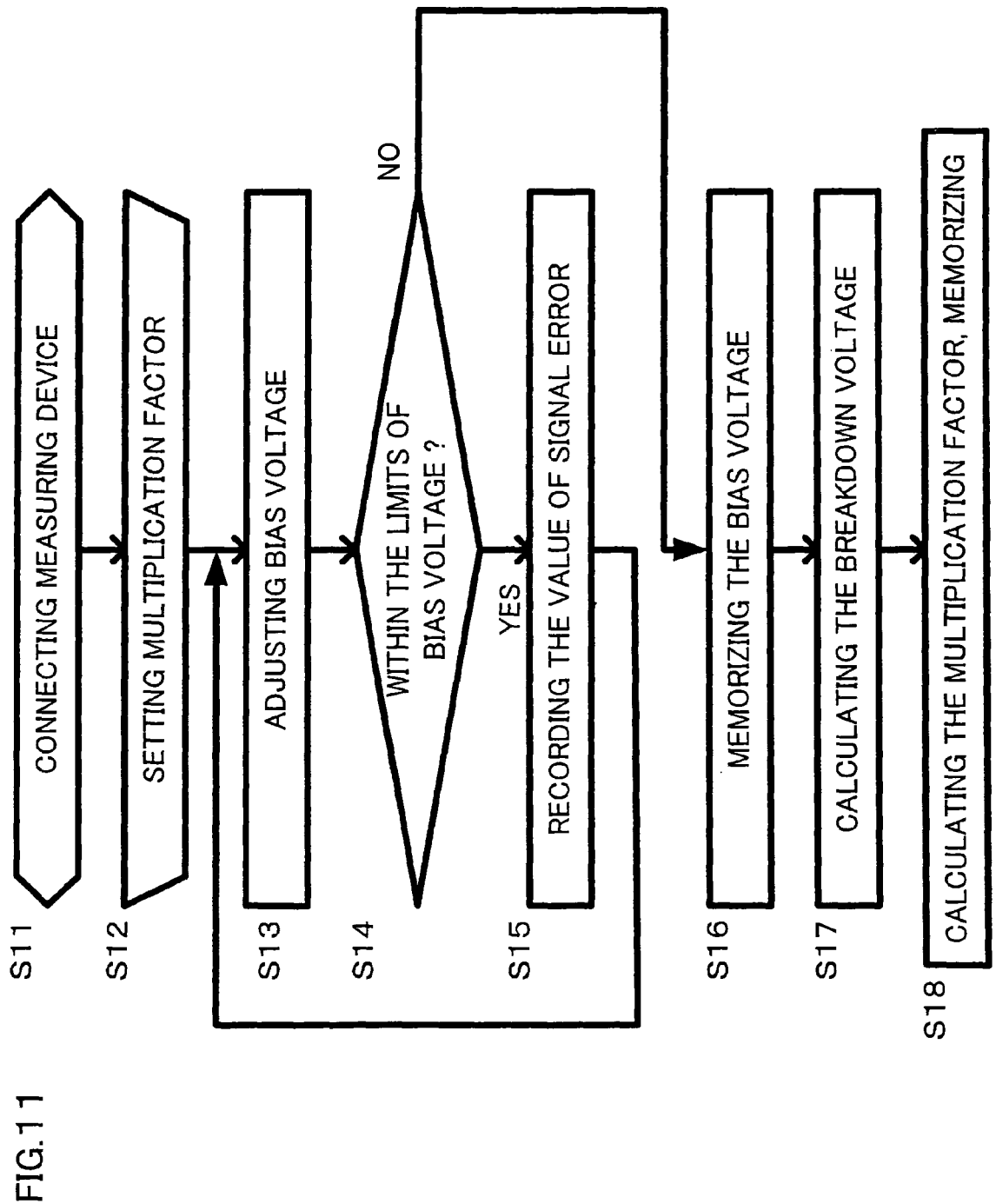
FIG. 11 shows a multiplication-factor-setting flow.

FIG. 11 shows a multiplication-factor-setting flow and a control flow illustrating the above-described step S10.

S11. The optical-receiving apparatus 1 illustrated in FIG. 6 is connected to the measuring device 2.

S12. An external device such as a PC is connected to the optical-receiving apparatus 1 and data shown in the rows (11) to (14) shown in FIG. 8 is stored in the data-memory part 413. Then, the external device transmits an instruction to the operating circuit 41 so that the standard multiplication factor M is set.

S13. According to the instruction transmitted from the external device, the operating circuit 41 controls the bias-circuit-control part 411 and sets a bias voltage that is generated by the bias circuit 20 and that is applied to the APD 10. The bias-voltage setting is performed, as follows. First, the minimum voltage that can be accepted, as the bias voltage, is set, for example. Then, voltages are scanned in sequence every voltage width that had already been determined within a control loop of the next steps S14 and S15 until the maximum voltage is set.

S14. It is determined whether or not the bias voltage set, at step S13, falls within the range of bias voltages that can be accepted, as the bias voltage of the APD 10.

S15. The processing corresponding to step S15 is performed when the bias voltage set, at step S14, falls within the range of bias voltages that can be accepted, as the bias voltage of the APD 10. At step S15, data on signal errors measured by the measuring device 2 is stored. Data on the bias voltage $V_{apd}$ and the error rate that are shown in the row (22) shown in FIG. 9 is stored in the data-memory part 413 via the external device. More specifically, data on the value of the error rate is stored every bias voltage $V_{apd}$. Namely, items of data on the values of the error rates are stored in sequence.

S16. The processing corresponding to step S16 is performed when the signal-error measurement is finished, at step S14, the signal-error measurement being performed within the range of bias voltages accepted, as the bias voltage of the APD 10. At step S16, the values of the signal errors, the values being measured and stored, at step S15, are retrieved by using data on the bias voltage, as a key, and the bias-voltage $V_{apd(M)}$ corresponding to the minimum measurement value is obtained, and the data on the bias voltage $V_{apd(M)}$ is stored.

S17. The breakdown voltage $V_{br}$ is calculated and obtained by using the ambient-temperature information of the APD 10, the ambient-temperature information being obtained through the temperature-monitor information 130 (the symbol T shown in the row (21) shown in FIG. 9), the temperature inclination $\lceil$ on which data is stored in the data-memory part 413 in advance (shown in the row (12) of FIG. 8), the breakdown voltage $V_{br(T=t)}$ of the APD 10 at the standard temperature, where the data on the breakdown voltage $V_{br(T=t)}$ is stored in the data-memory part 413 in advance (shown in the row (14) of FIG. 8), and the arithmetic expression (2) shown in FIG. 4.

S18. The multiplication factor M is calculated and obtained by using the bias voltage $V_{apd(M)}$ obtained, at step S16, the breakdown voltage $V_{br}$ obtained, at step S17, the constant n on which data is stored in the data-memory part 413 in advance (shown in the row (11) of FIG. 8), and the arithmetic expression (1) shown in FIG. 4. Then, the multiplication factor M is determined to be the standard multiplication factor M and data on the multiplication factor M is stored in the data-memory part 413 (shown in the row (25) of FIG. 9).

Figure 12:
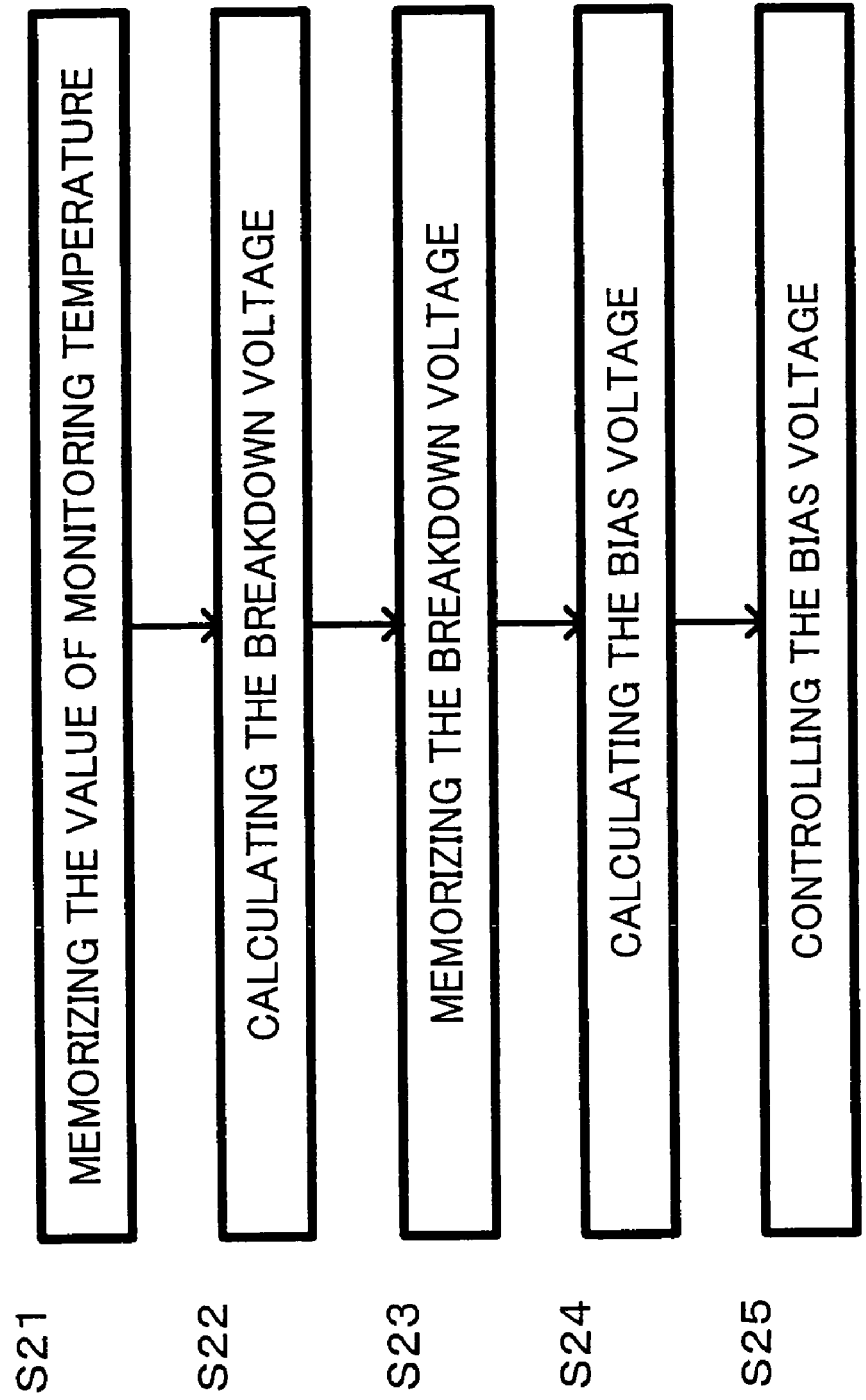
FIG. 12 shows a bias-voltage-controlling flow.

FIG. 12 is a bias-voltage-control flow and a control flow illustrating step S20 described above. The bias-voltage-control flow is the flow of processing procedures performed to control a bias voltage applied to the APD 10 according to the ambient temperature of the APD 10 when the optical-receiving apparatus 1 according to an embodiment of the present invention is operated for an optical-communication system (not shown).

S21. Information about the ambient temperature of the APD 10, the ambient-temperature information being obtained through the temperature-monitor information 130, is stored in the data-memory part 413 (shown in the row (21) of FIG. 9).

S22. The temperature inclination $\lceil$ on which data is stored in the data-memory part 413 in advance (shown in the row (12) of FIG. 8), the breakdown voltage $V_{br(T=t)}$ of the APD 10 at the standard temperature, where the data on the breakdown voltage $V_{br(T=t)}$ is stored in the data-memory part 413 in advance (shown in the row (14) of FIG. 8), and the temperature information obtained, at step S21 described above, are applied to the arithmetic expression (2) shown in FIG. 4 so that the breakdown voltage $V_{br}$ achieved at the temperature obtained, at step S21 described above, is calculated and obtained.

S23. Data on the breakdown voltage $V_{br}$ obtained, at step S22 described above, is stored in the data-memory part 413 (shown in the row (24) of FIG. 9).

S24. The constant n that is determined based on the composition of the element of the APD 10 and that is independent of a temperature, where data on the constant n is stored in the data-memory part 413 in advance (shown in the row (11) of FIG. 8), the breakdown voltage $V_{br}$ on which data is stored in the data-memory part 413, at step S23 described above (shown in the row (24) of FIG. 9), and the multiplication factor M on which data is stored in the data-memory part 413, at step S18 described above (shown in the row (25) of FIG. 9) are applied to the arithmetic expression (1) shown in FIG. 4 so that the bias voltage $V_{apd}$ is calculated and obtained, and data on the bias voltage $V_{apd}$ is stored in the data-memory part 413 shown in the row (26) of FIG. 9).

S25. The bias-circuit-control part 411 transmits the bias-voltage-control information 140 based on the bias voltage $V_{apd}$ on which data is stored in the data-memory part 413.

Here, the processing corresponding to steps S21 to S25 is performed at predetermined intervals.

As described above, an optical-receiving apparatus according to an embodiment of the present invention is connected to a signal-error-measuring device, a bias voltage achieved when the value of a signal error is minimized is obtained under a temperature condition achieved at the measurement time, a multiplication factor is calculated and obtained based on the bias voltage, the calculated and obtained multiplication factor is determined to be a standard multiplication factor, and data on the standard multiplication factor is stored in the optical-receiving apparatus. Further, if a change occurs in the ambient temperature of an avalanche photodiode provided in the optical-receiving apparatus, the bias voltage is controlled so that the standard multiplication factor is achieved. Subsequently, it becomes possible to provide an optical-receiving apparatus that can keep the multiplication factor constant at all times and a bias-voltage-control method used for the optical-receiving apparatus.

Second Embodiment

Figure 13:
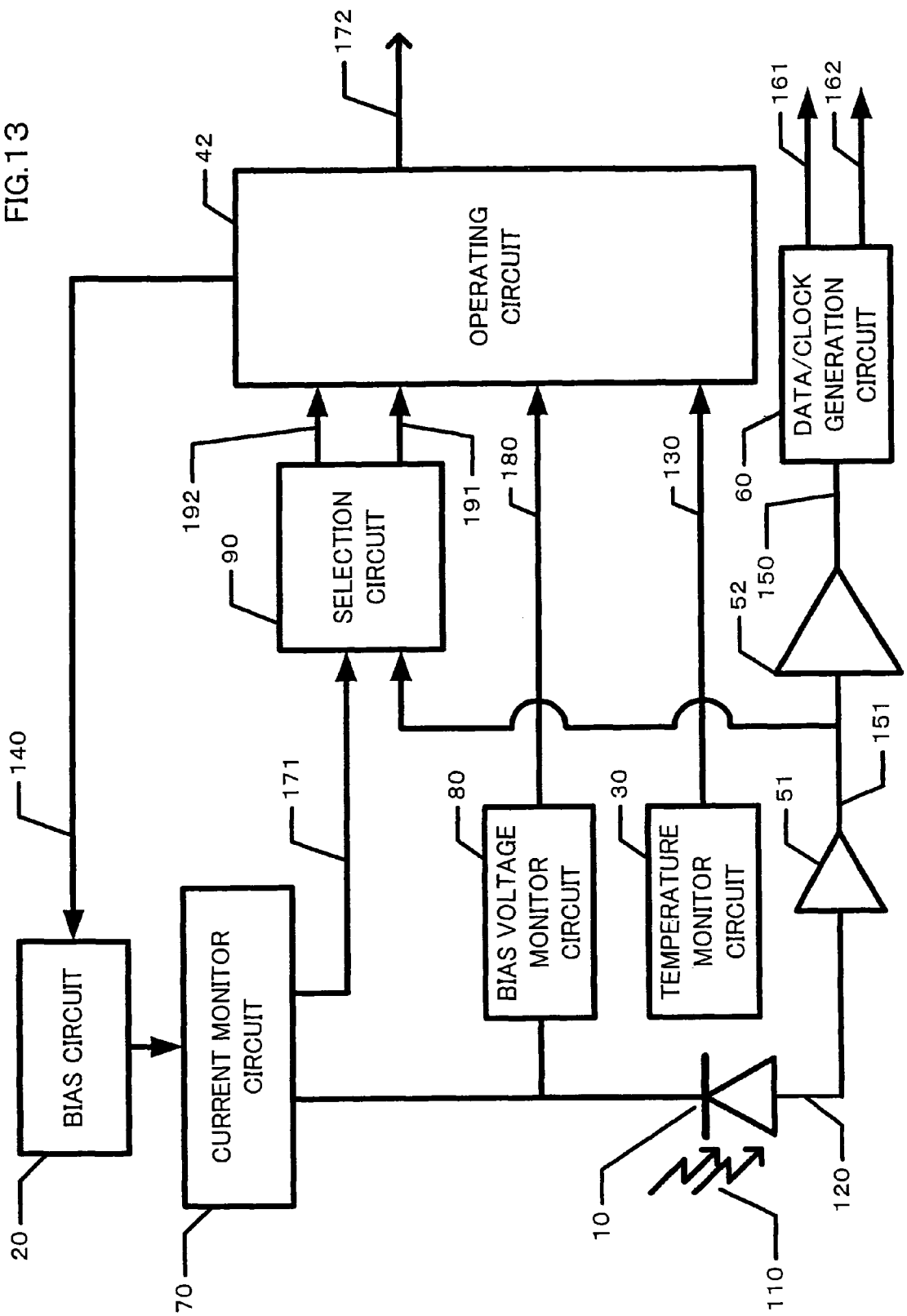
FIG. 13 is a drawing (2) illustrating an optical-receiving apparatus according to another embodiment of the present invention.

FIG. 13 is a drawing (2) illustrating an optical-receiving apparatus according to an embodiment of the present invention. The optical-receiving apparatus shown in FIG. 13 is different from that shown in FIG. 3 in that the configuration of the amplification circuit 50 is changed and a selection circuit 90 is added. Namely, an amplification circuit 51 performs voltage conversion for the optical-signal current 120 and amplifies a voltage signal obtained through the voltage conversion based on a constant multiplication factor so that a voltage signal 151 is obtained. An amplification circuit 52 amplifies the voltage signal 151 amplified based on the constant multiplication factor to a predetermined level. That is to say, the amplification circuit 50 illustrated in FIG. 3 is replaced with the above-described amplification circuits 51 and 52.

The selection circuit 90 switches between the signal of the monitor current 171 transmitted from the current-monitor circuit 70 and that of the voltage signal 151 transmitted from the amplification circuit 51 and transmits a monitor signal 191 to an operating circuit 42.

Figure 14:
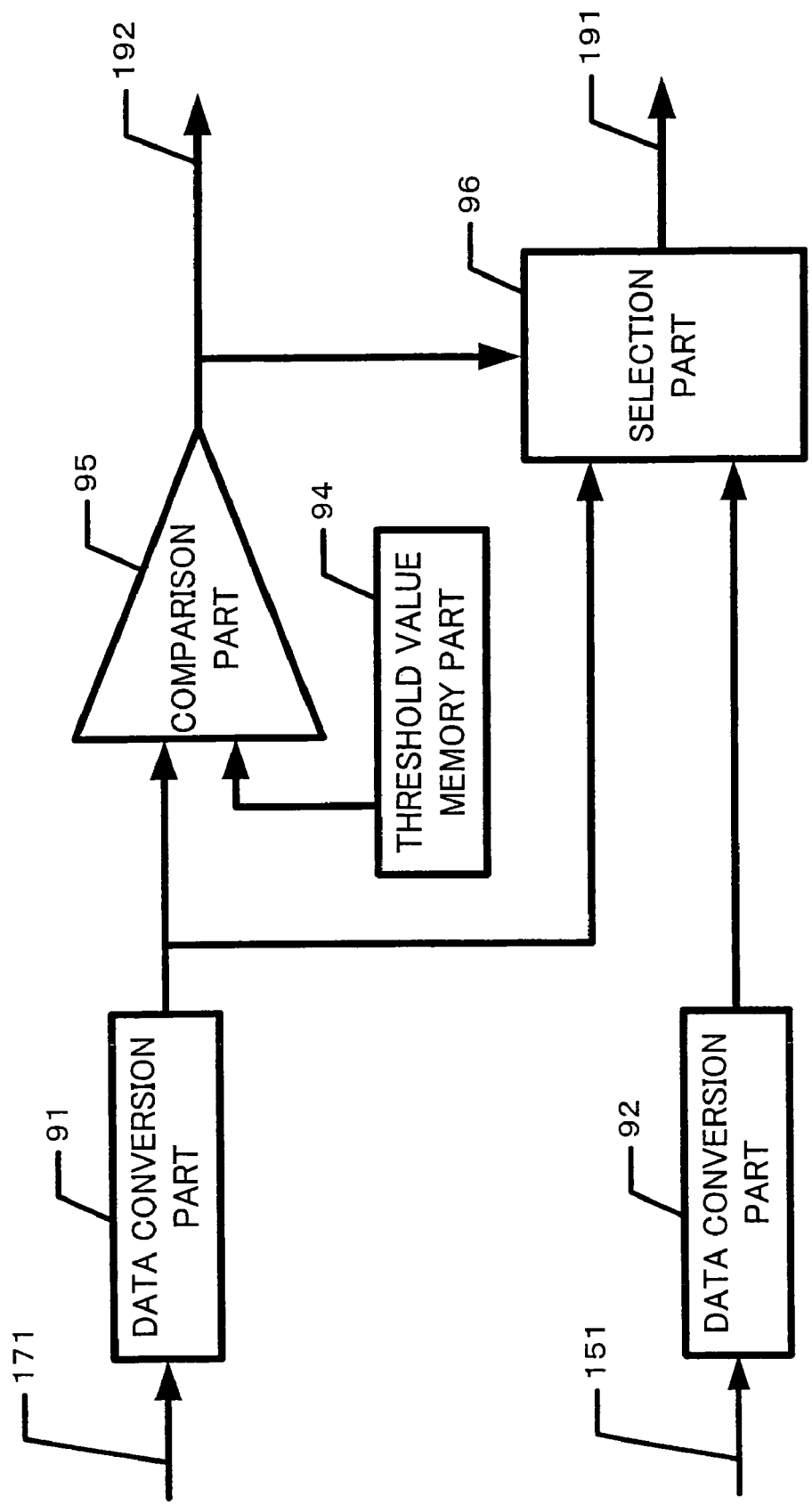
FIG. 14 illustrates a selection circuit.

FIG. 14 illustrates the selection circuit 90. A data-conversion part 91 converts the signal of the monitor current 171 transmitted from the current-monitor circuit 70 into voltage-signal data. That is to say, the data-conversion part 91 converts the analog signal of a current into digital data on a voltage. A data-conversion part 92 converts the voltage signal 151 transmitted from the amplification circuit 50 into voltage-signal data. That is to say, the data-conversion part 92 converts the analog signal of a voltage into voltage-digital data. A threshold-value-memory part 94 stores data on a threshold value in advance. A comparison part 95 compares data on a monitor-current value, that is, the digital data transmitted from the data-conversion part 91, to the threshold-value data stored in the threshold-value-memory part 94. A selection part 96 selects either the digital data transmitted from the data-conversion part 91 or the digital data transmitted from the data-conversion part 92 according to the comparison result obtained by the comparison part 95, and transmits the selected digital data to the operating circuit 42, as the monitor signal 191. The comparison part 95 generates the signal of the comparison result, that is, a comparison-result signal 192.

In FIG. 13, when the intensity of the optical signal 110 which is input light is significantly low, the level of each of signals of the optical-signal current 120 and the monitor current 171 becomes significantly low, and the ratio between the signal levels and the noise level of a circuit handling the above-described signals (the signal-to-noise ratio) deteriorates. Therefore, when the value of the signal level of the monitor current 171 becomes equivalent to a predetermined threshold value or less, the switch from the monitor current 171 to an amplified monitor current is made.

In FIG. 13, the amplification circuit 51 has a predetermined constant multiplication factor, converts a current signal of the optical-signal current 120 into a voltage signal, and amplifies the voltage signal based on the constant multiplication factor.

Subsequently, when the optical signal 110 is transmitted, the signal current 120 corresponding to the intensity of the optical signal 110 and the monitor current 171 used for the signal current 120 are generated. Further, the monitor current 171 and the voltage signal 151 amplified based on the constant multiplication factor are transmitted to the selection circuit 90.

According to FIG. 14, the data-conversion part 91 converts the current signal of the transmitted monitor current 171 into a voltage signal and performs analog-to-digital conversion (AD conversion) for the voltage signal so that the voltage signal is converted into voltage data. The data-conversion part 92 performs the AD conversion for the transmitted voltage signal 151 so that the voltage signal 151 is converted into voltage data. The voltage data externally transmitted from the data-conversion part 91 is transmitted to the comparison part 95 and the selection part 96. The comparison part 95 compares the voltage data transmitted from the data-conversion part 91 to data on the predetermined threshold value, the threshold-value data being stored in the threshold-value-memory part 94 in advance, and generates the comparison-result signal 192 corresponding to the comparison result. The selection part 96 selects either the voltage data transmitted from the data-conversion part 91 or the voltage data transmitted from the data-conversion part 92 based on the comparison-result-signal 192. When the selection result shows that the monitor-current value indicated by the voltage data transmitted from the data-conversion part 91 is larger than a current value indicated by the threshold-value data stored in the threshold-value-memory part 94, the selection part 96 selects the voltage data transmitted from the data-conversion part 91. If the monitor-current value is smaller than the above-described current value, the selection part 96 selects the voltage data transmitted from the data-conversion part 92, and externally transmits a selected monitor signal 191. If the monitor-current value indicated by the voltage data transmitted from the data-conversion part 91 is larger than the current value indicated by the threshold-value data stored in the threshold-value-memory part 94, for example, the value of the logic level of the comparison-result signal 192 becomes "0". On the other hand, if the monitor-current value is smaller than the current value, the value of the logic level of the comparison-result signal 192 becomes "1".

Figure 15:
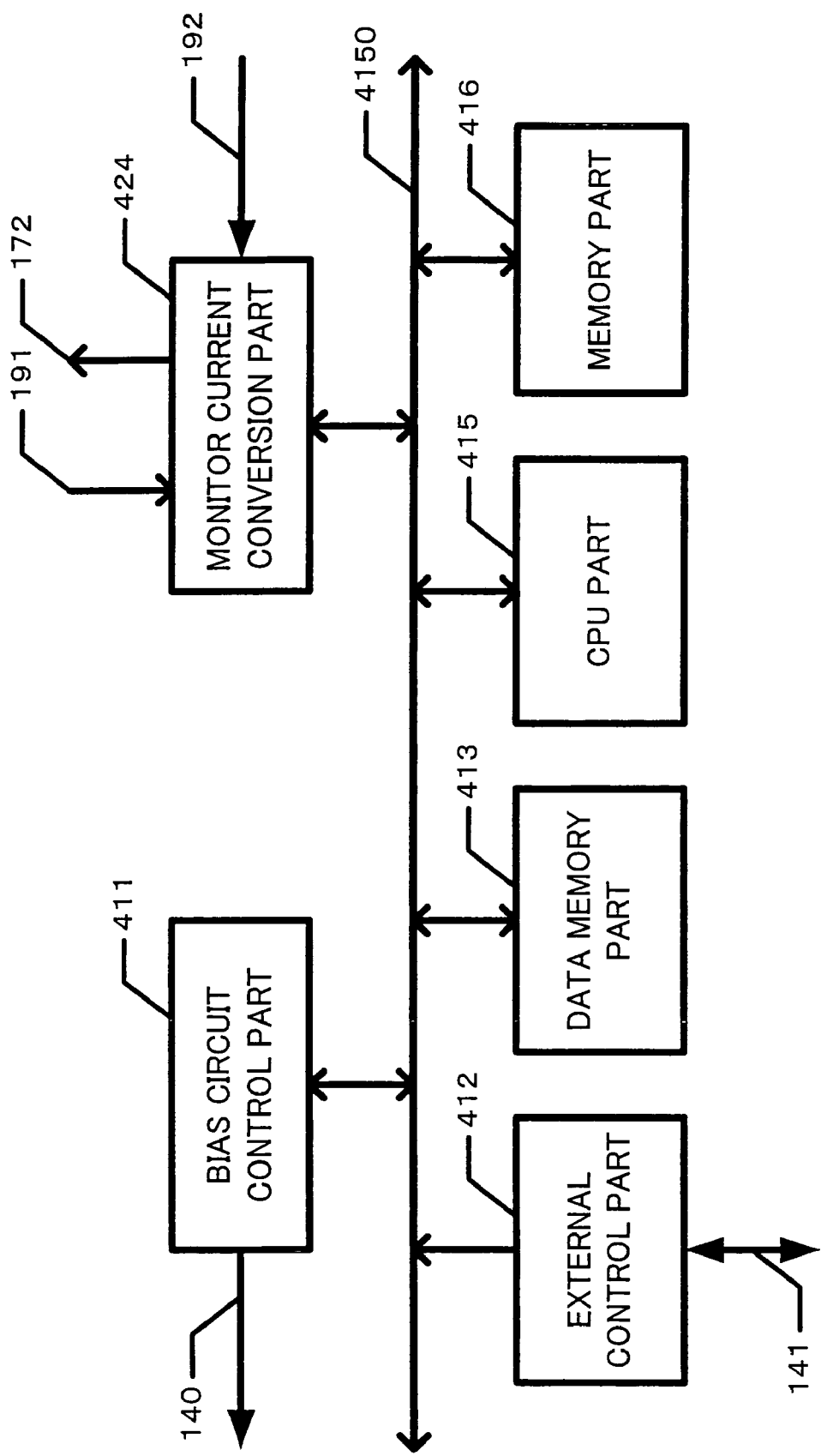
FIG. 15 is a drawing (2) showing the configuration of another operation circuit.

FIG. 15 illustrates an operating circuit (2), and the functional configuration of the operating circuit 42 shown in FIG. 13. When compared to the operating circuit 41 shown in FIG. 7, a monitor-current-conversion part 424 of the operating circuit 42 has the function of performing control based on the comparison-result signal 192 generated by the comparison part 95. That is to say, the monitor-current-conversion part 424 receives the monitor signal 191 and the comparison-result signal 192. When the value of the logic level of the comparison-result signal 192 is "0", the monitor-current-conversion part 424 converts the transmitted voltage data into data generated under conditions that had already been determined by MSA or the like so that the monitor signal 172 is generated. When the value of the logic level of the comparison-result signal 192 is "1", the monitor-current-conversion part 424 divides the monitor signal 191 based on the constant amplification rate of the amplification circuit 51 so that the level of the monitor signal 191 is reset to the level achieved before the amplification circuit 51 performs amplification, converts the transmitted voltage data into the data generated under the conditions that had already been determined by MSA or the like, and generates the monitor signal 172.

Thus, in addition to the optical-receiving device according to the first embodiment of the present invention, when the intensity of the transmitted optical signal is significantly low, a monitor signal is generated by using a signal amplified based on a predetermined amplification rate. Ultimately, the monitor signal corresponding to a level achieved by performing a division based on the above-described amplification rate is externally transmitted. Accordingly, an optical-receiving apparatus resistant to a circuit noise, that is to say, an optical-receiving apparatus with a wide dynamic range can be provided.

What is claimed is:
1. An optical-receiving apparatus comprising;
   an avalanche photodiode converting input light to an electric signal;
   a bias circuit generating a bias voltage applied to the avalanche photodiode based on a control signal;
   a temperature monitor circuit monitoring an ambient temperature of the avalanche photodiode;
   a current monitor circuit monitoring a current flowing through the avalanche photodiode;
   an amplification circuit amplifying the current flowing through the avalanche photodiode at a predetermined magnification;
   a selection circuit selectively transmitting a signal so that when a current value monitored by the current monitor circuit is larger than a predetermined value, the signal of the current value is transmitted, and when the current value is smaller than or equal to the predetermined value, the signal of a current value amplified by the amplification circuit is transmitted; and
   an operating circuit generating an attenuated signal so that when the current value is smaller than or equal to the predetermined value the operation circuit attenuates the signal transmitted from the selection circuit at the predetermined magnification, and controlling the bias circuit so that a multiplication factor corresponding to the ambient temperature monitored by the temperature monitor circuit becomes equal to a predetermined multiplication factor.
2. The optical-receiving apparatus according to claim 1;

wherein the predetermined multiplication factor is a multiplication factor corresponding to the bias voltage at which a signal error of the input light is minimized.

3. The optical-receiving apparatus according to claim 2;

wherein the operating circuit includes a memory part storing each of:

data related to a temperature inclination of a breakdown voltage of the avalanche photodiode;

data on a standard temperature and the breakdown voltage of the avalanche photodiode, the break down voltage being obtained at the standard temperature;

data related to a constant based on a composition of the avalanche photodiode element; and data related to the multiplication factor corresponding to the bias voltage obtained when the signal error is minimized.

* * * * *

UNITED STATES PATENT AND TRADEMARK OFFICE
CERTIFICATE OF CORRECTION

| | | |
|---|---|---|
| PATENT NO. | : 7,970,291 B2 | |
| APPLICATION NO. | : 12/000188 | |
| DATED | : June 28, 2011 | |
| INVENTOR(S) | : Yasunori Nagakubo | |

It is certified that error appears in the above-identified patent and that said Letters Patent is hereby corrected as shown below:

Cover Page item (57), Column 2, Abstract, Line 8-9, Delete "light-transmitted" and insert -- light transmitted --, therefor.
  Column 14, Line 2, In Claim 3, delete "break down" and insert -- breakdown --, therefor.

Signed and Sealed this
Thirteenth Day of September, 2011

David J. Kappos
*Director of the United States Patent and Trademark Office*